Jan. 30, 1968 S. POLANSKY 3,366,052

PRINTING APPARATUS AND METHOD

Original Filed Aug. 13, 1964

INVENTOR.
SEYMOUR POLANSKY
BY
Robert A. Green
ATTORNEY

United States Patent Office 3,366,052
Patented Jan. 30, 1968

3,366,052

PRINTING APPARATUS AND METHOD

Seymour Polansky, 72 Florence Road, Old Greenwich, Conn. 06870

Continuation of applications Ser. No. 389,306, Aug. 13, 1964, and Ser. No. 543,447, Mar. 24, 1966. This application Sept. 23, 1966, Ser. No. 581,663
1 Claim. (Cl. 101—426)

ABSTRACT OF THE DISCLOSURE

The disclosure is of a method of forming a printing plate which comprises preparing a mixture of either polyvinyl alcohol or starch combined with aluminum silicate and water. The method includes spreading the mixture in a substrate, partially hardening the mixture so that it is deformable but does not flow to any extent by itself, forming the pattern to be printed in the layer, and then hardening the layer to set the pattern.

Figure 1:
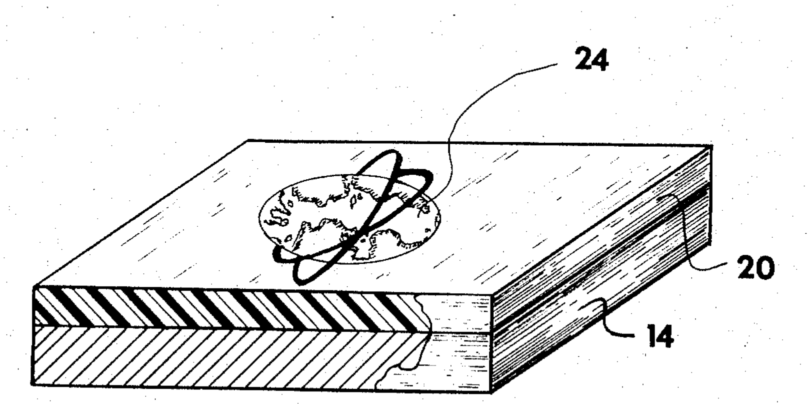

This application is a continuation of application Ser. No. 389,306, filed Aug. 13, 1964, and application Ser. No. 543,447, filed Mar. 24, 1966, both now abandoned.

This invention relates to novel printing apparatus and, particularly, to method and materials for preparing such apparatus.

Printing apparatus such as a printing plate of the type used in block printing carries a cutout pattern which is adapted to have a layer of ink applied to it, and then it is pressed on a suitable receiving surface on which the inked pattern is imprinted. Such a plate is made, generally, by providing a suitable body of an organic substance, wood, linoleum, or the like, and cutting the desired pattern therein by means of a sharp instrument. This type of printing plate is, in general, not suitable for use by amateurs or hobbyists because each plate can only be used with one printing pattern, and then it must ordinarily be discarded. In addition, such a device is not suitable for use by children because sharp tools must be used in preparing the printing block.

Accordingly, the objects of the invention concern the provision of improved printing devices and to methods and materials for preparing such devices.

The objects of the invention also concern the provision of printing devices and materials therefor which are water-soluble, and are easy to prepare and use.

Briefly, a printing device embodying the invention is prepared on any substrate, for example, it may be prepared on the types of substrates known and used in block printing, and, in addition, it may be prepared on a non-rigid substrate such as paper, cardboard, or the like. On the selected substrate or support surface is spread a thin film or layer of a water-based composition embodying the invention. After the film has been provided and while it is still wet or after it has partially hardened, the desired pattern to be printed is formed in the film. If the film is still wet and soft, the pattern may be formed by means of a sharp instrument, a dull instrument, or by means of the fingers. If the film is hard, any suitable device may be used. Even though the pattern to be printed is formed in the film while it is still wet and soft, the sharp definition of all lines is readily retained. After the film has hardened, it is inked and the pattern carried thereby is printed on a suitable receiving surface.

According to the invention, after the printing device thus formed is used, it may be discarded, or a new printing surface may be formed by spreading a second film over the first and reforming a second printing pattern in the second film. Alternatively, the first film may be removed from the substrate by dissolving it, and the second film may be formed on the original substrate. In addition, if desired, solid materials or plates or particles may be embedded to form part of the printing pattern.

Figure 2:
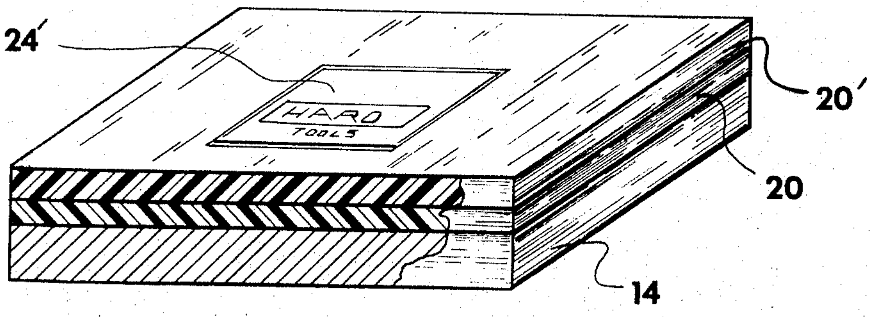

The invention is described in greater detail by reference to the drawing wherein:

FIG. 1 is a perspective view, partly in section, of printing apparatus embodying the invention; and FIG. 2 is a perspective view, partly in section, of a modification of the apparatus shown in FIG. 1.

Referring to the drawing, printing apparatus embodying the invention includes a support base or substrate 14 which may be of wood, a synthetic resinous material, carboard, paper or the like. On the substrate is spread, by any suitable means, such as a hand roller or the like, a layer or film 20 of a water-soluble substance which may carry a filler material, if desired. The film 20 may be a few mils in thickness, or it may be as much as 15 or 20 mils in thickness, depending primarily on the choice of the user. As soon as the film 20 has been formed and while it is still wet and fluid, that is, able to flow or be deformed, the desired pattern 24 to be printed is formed therein. The pattern may be formed by means of a sharp instrument, a blunt tool, or even with the fingers. Because of the nature of the film composition, to be described in detail below, even though it is fluid, it does not flow to any undesirable extent, and a pattern including fine lines may be formed without losing definition in the lines.

After the desired pattern 24 has been formed, the film 20 is dried to harden it, and then it is inked and the pattern is printed in conventional fashion. The printing may be achieved, for example, by spreading a layer of ink over the patterned layer 20 and then either pressing a print-receiving paper onto the surface of the inked film 20 or by pressing the apparatus into contact with the receiving paper.

In practicing the foregoing method, if desired, the film 20 may be allowed to dry and harden before the pattern 24 is formed therein.

After the printing plate carrying pattern 24 has been used, it may be discarded, or a new pattern may be formed in a new film on the same substrate 14. Thus, either the film 20 may be removed by dissolving it in water, or a second layer or film 20' (FIG. 2) may be spread over the first patterned film 20, and another pattern 24' may be formed as described above, and the printing process may be repeated. The second printing operation may be performed with ink of another color than the first printing, if desired.

According to the invention, the films used to form the above-described printing devices are water-based and may be water solutions, water dispersions, or water emulsions. The film-forming material itself may be any one of a large number of suitable substances including vinyl dispersions, polyvinyl alcohol, polyvinyl acetate, starch, dextrins, caseins, polyacrylates, polyvinylpyrrolidones, rubber latices, and the like.

Fillers or bodying agents which may be used are plentiful and include clays such as aluminum silicate pigments and bentonites, gum arabic, carboxy methyl cellulose, hydroxyethyl cellulose. Glycerine may be added as a diluent.

A film-forming composition according to the invention may contain no filler material, or it may contain as much as about 60% by weight.

One successful film-forming composition according to the invention which contained no filler material included:

| | Grams |
|---|---|
| Polyvinyl alcohol | 20 |
| Water | 100 |

One film-forming composition using filler material included:

| | Grams |
|---|---|
| Polyvinyl acetate emulsion (national starch 50% solids) | 1–20 |
| Aluminum silicate | 50 |
| Water | 50 |

The following compositions have also been used successfully:

(1)

| | Grams |
|---|---|
| Dextran | 16 |
| Water | 50 |
| Attagel 20 (clay) | 50 |

(2)

| | |
|---|---|
| Water-dispersable starch | 8 |
| Water | 50 |
| Aluminum silicate | 50 |

(3)

| | |
|---|---|
| Hot water-soluble starch | 8 |
| Water | 50 |
| Aluminum silicate | 50 |

(4)

| | |
|---|---|
| Polyvinyl alcohol | 30 |
| Water | 100 |
| Aluminum silicate | 100 |
| Glycerine | 10 |

(5)

| | |
|---|---|
| Polyvinyl alcohol | 50 |
| Aluminum silicate | 500 |
| Water | 1600 |

(6)

| | |
|---|---|
| Polyvinyl alcohol | 5 |
| Aluminum silicate | 50 |
| Water | 50 |

The invention described above has many advantages. One of the most important of these derives from the fact that water-based materials are used, with the result that they may be handled and used with ease by both adults and children. In addition, satisfactory films may be formed with very little material and thus very inexpensively. Another important advantage of the invention resides in the fact that the pattern to be printed may be formed while the film is fluid so that many types of tools can be used and, at the same time, the desired line definition can be maintained since the film-forming composition does not flow. Since a printing pattern can be formed without using sharp tools, the method is safe for children and others, such as the mentally retarded who lack complete motor control. Another advantage of the invention arises from the fact that a printing plate can be used over and over again by forming a new printing pattern over each old one.

What is claimed is:

1. The method of forming and using a printing plate including the steps of
   positioning a support member horizontally to receive a layer of pattern-receiving material,
   spreading a layer of pattern-receiving material in a fluid state on said support member,
   said material comprising a mixture of about fifty parts by weight of aluminum silicate filler, about five to about fifteen parts by weight of a substance selected from the group consisting of polyvinyl alcohol and starch, and water to render the material fluid,
   partially hardening said layer so that it is deformable but will not flow to any extent,
   forming in said layer a pattern to be printed,
   hardening said layer to render it usable as a printing medium,
   applying a layer of printing ink to the hardened printing layer, and then printing the inked pattern on a print-receiving surface.

References Cited

UNITED STATES PATENTS

| | | | |
|---|---|---|---|
| 1,980,069 | 11/1934 | Lewis | 101—401.1 |
| 626,016 | 5/1899 | Bell. | |

DAVID KLEIN, *Primary Examiner.*